(12) United States Patent
Kim et al.

(10) Patent No.: US 11,170,479 B2
(45) Date of Patent: Nov. 9, 2021

(54) DISPLAY APPARATUS AND CONTROL METHOD THEREOF

(71) Applicant: SAMSUNG ELECTRONICS CO., LTD., Suwon-si (KR)

(72) Inventors: Beomjoon Kim, Suwon-si (KR); Seungho Park, Suwon-si (KR); Minjae Lee, Suwon-si (KR); Youngseok Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/864,840

(22) Filed: May 1, 2020

(65) Prior Publication Data

US 2020/0402216 A1    Dec. 24, 2020

(30) Foreign Application Priority Data

Jun. 19, 2019  (KR) .................. 10-2019-0072846

(51) Int. Cl.
*G06T 5/00*   (2006.01)
*G06T 5/40*   (2006.01)
(Continued)

(52) U.S. Cl.
CPC ............... *G06T 5/009* (2013.01); *G06T 5/40* (2013.01); *G09G 5/10* (2013.01);
(Continued)

(58) Field of Classification Search
CPC combination set(s) only.
See application file for complete search history.

(56) References Cited

U.S. PATENT DOCUMENTS 10,176,561  B2    1/2019  Evans et al.
2013/0170540 A1*  7/2013  Damkat ............... H04N 19/154
                                          375/240.01
(Continued)

FOREIGN PATENT DOCUMENTS

EP     3687184 A1    7/2020
JP     2018-026794 A  2/2018
(Continued)

OTHER PUBLICATIONS

International Search Report and Written Opinion (PCT/ISA/210 and PCT/ISA/237), dated Aug. 20, 2020 by International Searching Authority in International Application No. PCT/KR2020/005524.
(Continued)

*Primary Examiner* — Wesner Sajous
(74) *Attorney, Agent, or Firm* — Sughrue Mion, PLLC

(57) ABSTRACT

Disclosed is a display apparatus. The display apparatus obtains first characteristic information, which is provided according to a plurality of sections of content and corresponds to an image characteristic of a section to be displayed among the plurality of seconds, from a signal received in the signal receiver, obtains first image-quality setting information for setting image quality of the section based on the obtained first characteristic information, obtains second characteristic information corresponding to an image characteristic of a frame included in the section from the frame, obtains second image-quality setting information for setting image quality of the frame based on the obtained first image-quality setting information and the obtained second characteristic information, and controls the display to display an image of the frame, the image quality of the frame being set based on the obtained second image-quality setting information.

18 Claims, 12 Drawing Sheets
(1 of 12 Drawing Sheet(s) Filed in Color)

(51) Int. Cl.
G09G 5/10 (2006.01)
H04N 5/235 (2006.01)
H04N 9/64 (2006.01)
H04N 9/74 (2006.01)

(52) U.S. Cl.
CPC ............. *G06T 2207/20208* (2013.01); *G09G 2320/066* (2013.01); *G09G 2320/0686* (2013.01); *G09G 2320/08* (2013.01)

(56) References Cited

U.S. PATENT DOCUMENTS

| | | |
|---|---|---|
| 2016/0014433 A1 | 1/2016 | Raina et al. |
| 2016/0104438 A1* | 4/2016 | Han ................... G09G 3/3413 345/690 |
| 2017/0125063 A1 | 5/2017 | Atkins et al. |
| 2017/0180759 A1* | 6/2017 | Mertens ................ H04N 19/16 |
| 2017/0330312 A1 | 11/2017 | Nam |
| 2018/0035088 A1 | 2/2018 | Nose |
| 2018/0102106 A1 | 4/2018 | Shintani |
| 2019/0019277 A1* | 1/2019 | Chen ..................... H04N 5/202 |
| 2019/0020852 A1 | 1/2019 | Bak et al. |
| 2019/0139203 A1* | 5/2019 | Yokota .................. G09G 5/005 |
| 2019/0342603 A1* | 11/2019 | Hirota .................... G11B 27/00 |
| 2020/0267440 A1* | 8/2020 | Kim .................. H04N 21/4516 |

FOREIGN PATENT DOCUMENTS

| | | |
|---|---|---|
| JP | 2018-109676 A | 7/2018 |
| KR | 10-2019-0017290 A | 2/2019 |
| WO | 2019098619 A1 | 5/2019 |

OTHER PUBLICATIONS

Communication dated Sep. 21, 2020, from the European Patent Office in counterpart European Application No. 20176610.2.
Communication dated Sep. 20, 2021, issued by the European Patent Office in European Application No. 20176610.2.

* cited by examiner

DISPLAY APPARATUS AND CONTROL METHOD THEREOF

CROSS-REFERENCE TO RELATED THE APPLICATION

This application is based on and claims priority under 35 U.S.C. § 119 to Korean Patent Application No. 10-2019-0072846 filed on Jun. 19, 2019 in the Korean Intellectual Property Office, the disclosure of which is incorporated by reference herein in its entirety.

BACKGROUND

Field

The disclosure relates to a display apparatus and a control method thereof, in which an image is displayed with image quality optimized according to frames even though brightness is suddenly varied within one scene of high dynamic range (HDR) content in terms of applying dynamic tone mapping (DTM) to the HDR content, thereby increasing an immersion level of a user.

Description of the Related Art

To satisfy a user who wants an image with more realistic image quality, high dynamic range (HDR) technology has recently been in the limelight. A dynamic range of brightness a human perceives is about 10,000 nits, whereas the dynamic range of brightness the display apparatus can handle is narrower than 10,000 nits. Therefore, there is a limit to how realistic the display apparatus can achieve the image quality. The HDR technology refers to a technique for extending a brightness range of an input image to become closer to a brightness range a human's eye perceives, by adjusting a brightness range between the brightest part and the darkest part of the input image. With such HDR technology, an image with various authentic brightness levels from intense sunlight to starlight in a dark night sky is so realistically displayed that a user can become more immersed in the image.

To display an HDR image based on the HDR technology, there is a need of setting the image quality. For example, static tone mapping (STM) may be performed by equally applying tone mapping throughout the image, or dynamic tone mapping (DTM) may be performed by applying tone mapping in units of scenes of the image. In a case of the DTM, tone mapping curves set according to the scenes of the image are used to display the image with a tone optimized according to the scenes.

SUMMARY

According to an exemplary embodiment, there is provided a display apparatus comprising a signal receiver, a display, and a processor configured to obtain first characteristic information, which is provided according to a plurality of sections of content and corresponds to an image characteristic of a section to be displayed among the plurality of sections, from a signal received in the signal receiver, obtain first image-quality setting information for setting image quality of the section based on the obtained first characteristic information, obtain second characteristic information corresponding to an image characteristic of a frame included in the section from the frame, obtain second image-quality setting information for setting image quality of the frame based on the obtained first image-quality setting information and the obtained second characteristic information, and control the display to display an image of the frame based on the obtained second image-quality setting information.

The first image-quality setting information may comprise a first mapping curve for setting a tone of an image to be displayed based on an input image.

The second characteristic information may comprise information obtained from a histogram about a plurality of pixel values of the frame.

The second characteristic information may comprise at least one of an average brightness value, a maximum brightness value, or a brightness value distribution of a plurality of pixels of the frame.

The second characteristic information may comprise a plurality of characteristic values obtained from a plurality of pixels of the frame, and the processor may obtain the second image-quality setting information by applying a weighted value to the plurality of characteristic values.

The processor may obtain the second image-quality setting information by adjusting the first image-quality setting information based on the second characteristic information.

The processor may set the image quality of the frame based on the second image-quality setting information, based on difference between the image characteristic of the frame and the image characteristic of the section being greater than or equal to a predetermined value.

The processor sets the image quality of the section based on the first image-quality setting information, based on difference between the image characteristic of the frame and the image characteristic of the section being lower than a predetermined value.

The processor sets the image quality based on the second image-quality setting information with respect to at least one frame selected among a plurality of frames included in the section based on predetermined periodicity.

According to another exemplary embodiment, there is provided a method of controlling a display apparatus that comprises obtaining first characteristic information, which is provided according to a plurality of sections of content and corresponds to an image characteristic of a section to be displayed among the plurality of sections, from a received signal, obtaining first image-quality setting information for setting image quality of the section based on the obtained first characteristic information, obtaining second characteristic information corresponding to an image characteristic of a frame included in the section from the frame, obtaining second image-quality setting information for setting image quality of the frame based on the obtained first image-quality setting information and the obtained second characteristic information, and displaying an image of the frame based on the obtained second image-quality setting information.

The first image-quality setting information may comprise a first mapping curve for setting a tone of an image to be displayed based on an input image.

The second characteristic information may comprise information obtained from a histogram about a plurality of pixel values of the frame.

The second characteristic information may comprise at least one of an average brightness value, a maximum brightness value, or a brightness value distribution of a plurality of pixels of the frame.

The second characteristic information may comprise a plurality of characteristic values obtained from a plurality of pixels of the frame, and the obtaining of the second image-quality setting information may comprise obtaining the second image-quality setting information by applying a weighted value to the plurality of characteristic values.

The obtaining of the second image-quality setting information may comprise obtaining the second image-quality setting information by adjusting the first image-quality setting information based on the second characteristic information.

The obtaining of the second image-quality setting information may comprise setting the image quality of the frame based on the second image-quality setting information, based on difference between the image characteristic of the frame and the image characteristic of the section being greater than or equal to a predetermined value.

The obtaining of the second image-quality setting information may comprise setting the image quality of the section based on the first image-quality setting information, based on difference between the image characteristic of the frame and the image characteristic of the section being lower than a predetermined value.

The displaying of the image of the frame may comprise setting the image quality based on the second image-quality setting information with respect to at least one frame selected among a plurality of frames included in the section based on predetermined periodicity.

According to another exemplary embodiment, there is provided a recording medium stored with a computer program comprising a code for carrying out a method of controlling a display apparatus, as a computer readable code, the method comprising obtaining first characteristic information, which is provided according to a plurality of sections of content and corresponds to an image characteristic of a section to be displayed among the plurality of sections, from a received signal, obtaining first image-quality setting information for setting image quality of the section based on the obtained first characteristic information, obtaining second characteristic information corresponding to an image characteristic of a frame from the frame included in the section; obtaining second image-quality setting information for setting image quality of the frame based on the obtained first image-quality setting information and the obtained second characteristic information, and displaying an image of the frame based on the obtained second image-quality setting information.

The obtaining of the second image-quality setting information may comprise setting the image quality of the frame based on the second image-quality setting information, based on difference between the image characteristic of the frame and the image characteristic of the section being greater than or equal to a predetermined value.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or the aspects will become apparent and more readily appreciated from the following description of exemplary embodiments taken in conjunction with the accompanying drawings, in which.

DETAILED DESCRIPTION

Figure 1:
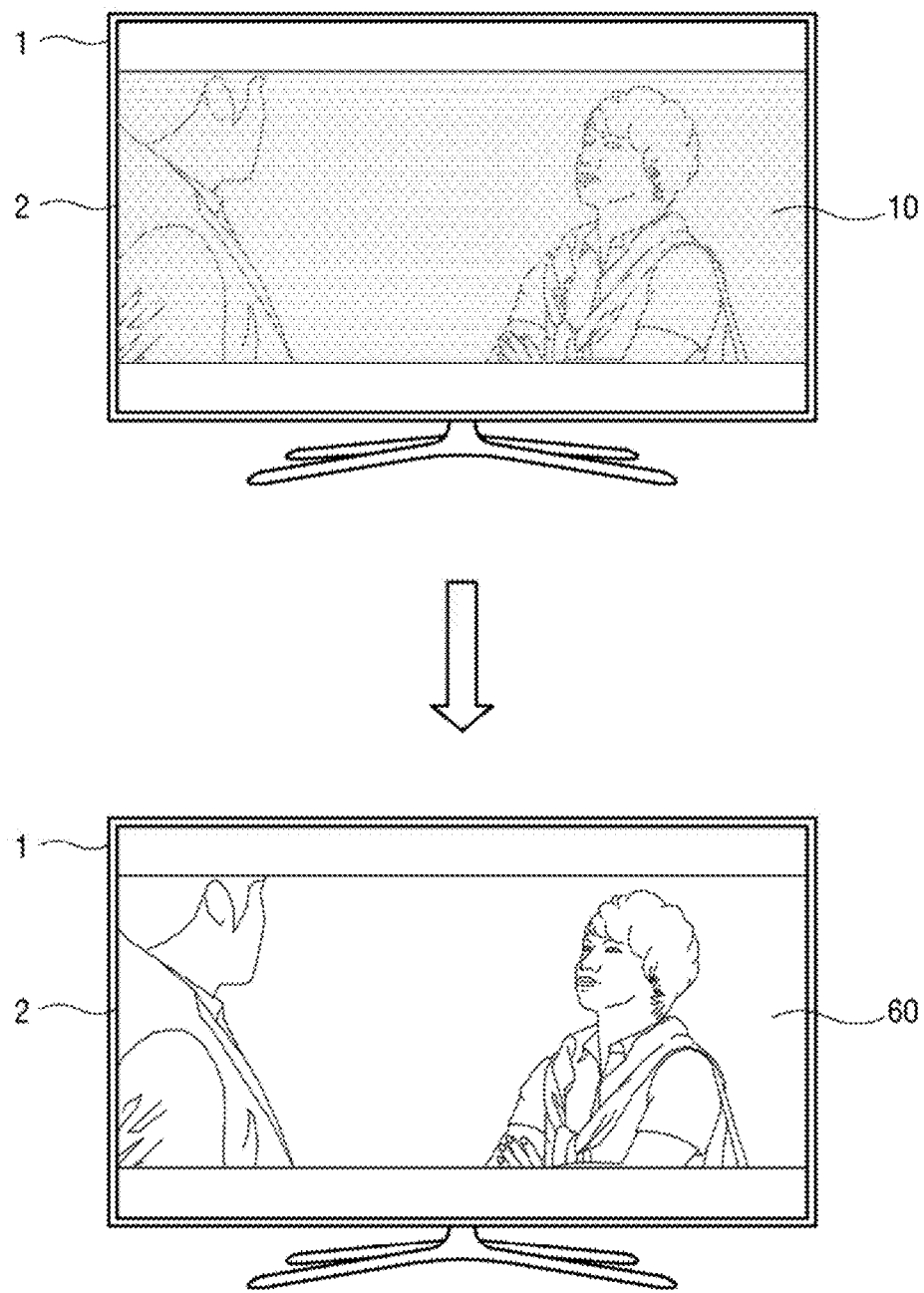
FIG. 1 illustrates a display apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same operations. In the disclosure, at least one among a plurality of elements refers to not only all the plurality of elements but also both each one of the plurality of elements excluding the other elements and a combination thereof.

FIG. 1 illustrates a display apparatus according to an embodiment of the disclosure. As shown in FIG. 1, the display apparatus 1 according to this embodiment may display an image on a display 2. FIG. 1 shows that the display apparatus 1 is a television (TV), but the display apparatus 1 is not limited to the TV. Alternatively, the display apparatus 1 may be embodied by a smartphone, a tablet computer, a personal computer, a wearable device such as a smart watch, a multimedia player, an electronic frame, home appliances such as a refrigerator, or the like capable of displaying an image. However, for convenience of description, descriptions will be made on the assumption that the display apparatus 1 is the TV.

The display apparatus 1 may display an image based on content. The content may include high dynamic range (HDR) content. The HDR content may be produced having brightness or the like suited for a reference display apparatus by a so-called mastering process on the assumption that it will be displayed on the reference display apparatus. The HDR content produced by such a mastering process may include HDR content data, and characteristic information for setting the image quality of the HDR content. For example, the characteristic information may include static metadata for setting a fixed image quality to the whole HDR content. In this case, the display apparatus 1 may obtain image-quality setting information fixed with regard to the whole HDR content based on the static metadata, performs batch image-quality setting with regard to the whole HDR content based on the obtained image-quality setting information, and display an image based on the HDR content with the set image quality.

Alternatively, the characteristic information may include dynamic metadata for setting image quality variable depending on each of a plurality of sections in the HDR content. Here, the sections refer to a series of image event units in which at least one action, behavior, event, etc. occurs in continuous time or space, and may for example include scenes. In this case, the display apparatus 1 may obtain section image-quality setting information corresponding to each section of the sections of the HDR content based on the dynamic metadata, perform image-quality setting according to the sections based on the obtained section image-quality setting information, and display an image 10 of each section of the sections of the HDR content based on the image quality set according to the sections.

Thus, the display apparatus 1 carries out the image-quality setting according to the sections based on the section image-quality setting information corresponding to each of the sections of the content, and displays the image 10 of each section of the sections with the set image quality, thereby displaying the image 10 of the section with the image quality optimized according to the sections.

In particular, with regard to content having a plurality of frames, the display apparatus 1 according to this embodiment may obtain frame image-quality setting information based on frame characteristic information of each frame of the frames and section image-quality setting information of a section of the sections, to which each frame belongs, set image quality according to the frames based on the obtained frame image-quality setting information, and display an image 60 of the corresponding frame with the set image quality. For example, the display apparatus 1 may obtain frame brightness-setting information for setting a brightness range of each frame of the frames by considering the frame characteristic information corresponding to each frame of the frames and section brightness-setting information of a section of the sections, to which each frame belongs, with regard to the HDR content. The display apparatus 1 may set the brightness range of each frame of the frames based on the obtained frame brightness-setting information, and display the image 60 of the corresponding frame with the set brightness range.

Thus, the display apparatus 1 according to this embodiment obtains the frame image-quality setting information based on the frame characteristic information corresponding to each frame of the frames and the section image-quality setting information of the section, to which each frame belongs, with regard to the frames in the content, and displays the image 60 of the corresponding frame with the image quality set based on the obtained frame image-quality setting information, thereby displaying the image 60 of the frame with the image quality optimized according to the frames as compared to the case where the image 10 of each frame is displayed with a batch-set image quality in the corresponding section based on only the section image-quality setting information corresponding to the section.

Figure 2:
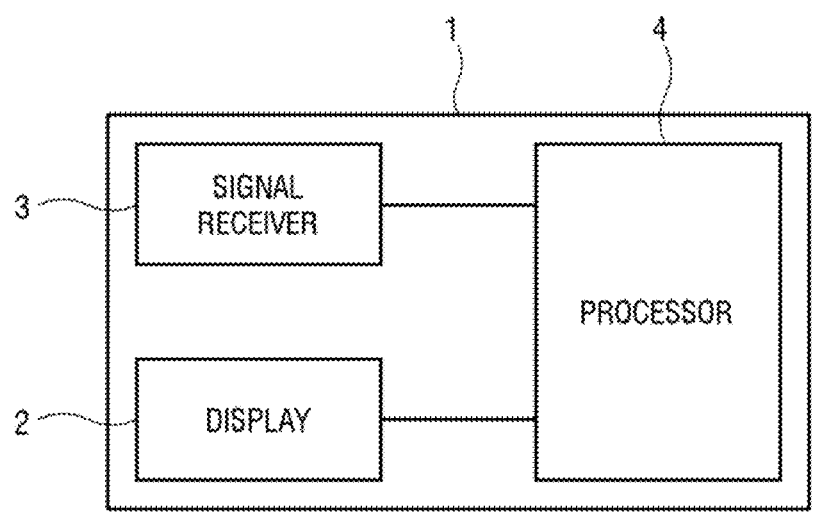
FIG. 2 is a block diagram showing an exemplary configuration of the display apparatus in FIG. 1.

FIG. 2 is a block diagram showing an exemplary configuration of the display apparatus in FIG. 1. As shown in FIG. 2, the display apparatus 1 according to this embodiment may include a display 2, a signal receiver 3, and a processor 4.

The signal receiver 3 may receive a signal. The signal may include HDR content, and may be received from a content providing apparatus. The content providing apparatus may for example include a set-top box, a Blu-ray disc, etc. In this case, the signal receiver 3 may receive a signal from the set-top box, the Blu-ray disc, etc. according to high definition multimedia interface (HDMI) standards. Alternatively, the content providing apparatus may include a server of a content provider or the like connected through a network. In this case, the signal receiver 3 may receive a signal from the server of the content provider or the like by a streaming method. However, the content providing apparatus from which the signal receiver 3 receives the signal is not limited to the foregoing examples. Alternatively, the signal receiver 3 may receive a terrestrial signal, a cable signal, an Internet protocol (IP) signal, etc. from a server of an external terrestrial TV, a cable TV (CATV), an IPTV, etc. or may receive a signal through a portable storage medium such as a digital versatile disc (DVD), a smart phone, a tablet computer, etc.

The display 2 may display an image based on a signal received in the signal receiver 3. For example, the display 2 may display a broadcast image based on a broadcast signal of a tuned channel. For example, there are various types of the display 2, such as liquid crystal, plasma, an organic light-emitting diode, a carbon nano-tube, nano-crystal, etc., and the display 2 is not limited to these types.

The processor 4 may control general elements of the display apparatus 1. For example, the processor 4 may obtain first characteristic information, which is provided according to a plurality of sections of content and corresponds to an image characteristic of a section to be displayed among the plurality of sections, from a signal received through the signal receiver 3, and obtain first image-quality setting information for setting image quality of the section based on first characteristic information. Further, the processor 4 may obtain second characteristic information corresponding to an image characteristic of a frame included in the section from the frame, and obtain second image-quality setting information for setting image quality of the frame based on the first image-quality setting information and the second characteristic information. Further, the processor 4 may control the display 2 to display the image 60 of the frame with the image quality set based on the second image-quality setting information.

The processor 4 may include a control program (or instruction) for performing control with regard to general elements, a nonvolatile memory in which the control program is installed, a volatile memory in which at least a part of the installed control program is loaded, and at least one processor or central processing unit (CPU) for executing a loaded control program. Further, such a control program may be stored in an electronic apparatus other than the display apparatus 1.

The control program may include a program(s) implemented in the form of at least one among a basis input/output system (BIOS), a device driver, an operating system, a firmware, a platform, and an application. According to an exemplary embodiment, the application may be previously installed or stored when the display apparatus 1 is manufactured, or may be installed based on application data received from the outside when it is used in the future. The application data may for example be downloaded from an application market and the like external server. Such a server is an example of a computer program product, but not limited to this example.

At least one element may be excluded from the foregoing configuration of the display apparatus 1 or the display apparatus 1 may include another element in addition to the foregoing configuration. For example, the display apparatus 1 may further include a signal processor, a storage, a power supply, etc.

The signal processor may perform predetermined signal processing with regard to a signal received in the signal receiver. In a case of an image signal, for example, the signal processor performs image processing with regard to the image signal received in the signal receiver 3, and displays an image on the display 2. There are no limits to the kinds of image processing, and the image processing may for example include tuning for the received image signal, decoding corresponding to the kind of image signal, scaling, noise reduction, detail enhancement, frame refresh rate conversion, etc.

Further, the signal processor may perform audio processing with regard to an audio signal so that a sound can be output through a sound output unit achieved by a loudspeaker or the like.

The signal processor may include a hardware processor achieved by a chipset, a circuit, a buffer, etc. mounted onto a printed circuit board, or may be designed as a system on chip (SoC).

The storage may be configured to store data for processing the elements of the display apparatus 1 and programs for controlling the elements. The storage may include a storage medium of at least one type among a flash memory type, a hard disk type, a multimedia card micro type, a card type memory, and a read only memory (ROM). Further, the storage may be achieved by a web storage configured to store data and programs on the Internet.

Meanwhile, the power supply may receive power from an external power source or an internal power source under control of the processor 4 and supply required power to the elements of the display apparatus 1.

Figure 3:
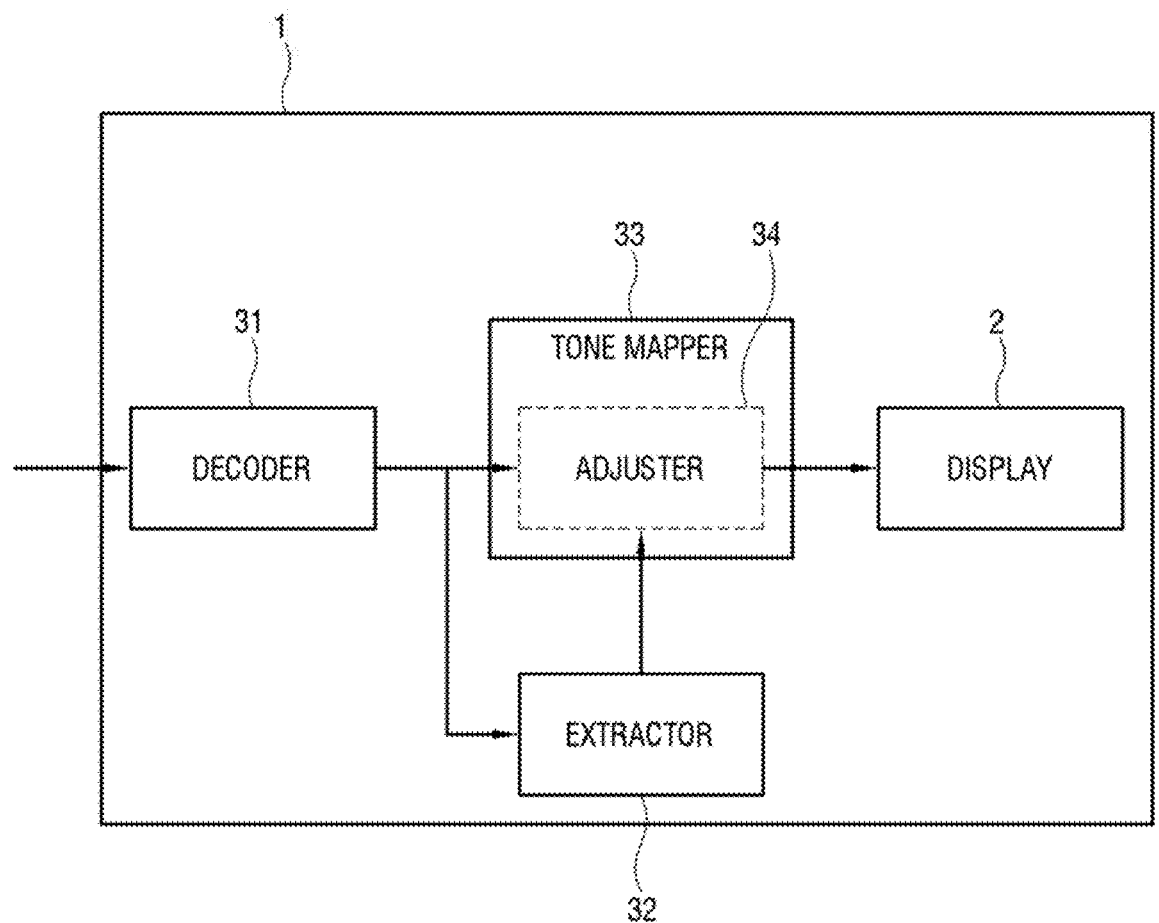
FIG. 3 is a block diagram showing another exemplary configuration of the display apparatus in FIG. 1.

FIG. 3 is a block diagram showing another exemplary configuration of the display apparatus in FIG. 1. As shown in FIG. 3, the display apparatus 1 according to this embodiment may include a decoder 31, an extractor 32, a tone mapper 33, and the display 2, and the tone mapper 33 may further include an adjuster 34. Below, details will be described avoiding repetitive descriptions and focusing on only difference between FIGS. 2 and 3.

The decoder 31 may receive a signal including HDR content from the content provider or the content providing apparatus, and decode the received signal. For example, the content provider may generate the HDR content based on raw data of an image or digital data digitally converted from an image scanned from an analog film by a scanner. The content provider may encode the HDR content and the characteristic information showing an image characteristic of the HDR content. As necessary, the encoded signal may be provided to the content providing apparatus such as a set-top box, a Blu-ray disc, etc.

The characteristic information refers to information about image characteristics of the HDR content, and may include section metadata about image characteristics of each of the plurality of sections of the HDR content. The section metadata may for example include information about a histogram, an average brightness value, a maximum brightness value, distribution of brightness values, etc. of each section of the plurality of sections of the HDR content.

In particular, the characteristic information according to this embodiment may include frame metadata about image characteristics of each frame of the HDR content. The frame metadata may be provided corresponding to the frames of each section of the plurality of sections, and may include characteristic information about image characteristics of each frame of the frames. For example, the frame metadata may include information about a histogram, an average brightness value, a maximum brightness value, distribution of brightness values, etc. of each frame of the frames.

The extractor 32 may extract the characteristic information from the decoded signal, and transmit the extracted characteristic information to the tone mapper 33. For example, the extractor 32 may identify the kind of metadata to extract the metadata. The metadata includes a field of various information units, and a value of the corresponding field. The field refers to format data of the metadata showing items of the information, and the value of the field refers to content data or parameter showing a value of the item of the corresponding information. The extractor 32 may perform a search for the field showing the kind of metadata, identify the kind of metadata, e.g. identify whether the kind of metadata is the section metadata or the frame metadata based on the search results, and extract the identified section metadata or frame metadata from the signal.

The tone mapper 33 may obtain the image-quality setting information for setting image quality of an image about HDR content based on the characteristic information received from the extractor 32. The image-quality setting information may include a tone mapping curve for setting a tone of the HDR content. For example, the tone mapper 33 may receive the section metadata from the extractor 32, and obtain a section tone mapping curve for setting the tone corresponding to each section of the plurality of sections of the HDR content based on the received section metadata. Further, the display 2 may display the image 10 of each section of the plurality of sections of the HDR content, the tone of which is set based on the obtained section tone mapping curve.

In particular, the adjuster 34 according to this embodiment may receive the frame metadata from the extractor 32, and adjust the section tone mapping curve obtained by the tone mapper 33 based on the received frame metadata. The adjuster 34 may obtain a frame tone mapping curve for setting the tone of each frame of the frames of the HDR content based on the adjusted section tone mapping curve. The display 2 may display the image 60 of each frame of the frames of the HDR content, the tone of which is set based on the obtained frame tone mapping curve.

Thus, the display apparatus 1 according to this embodiment obtains the frame tone mapping curve by adjusting the section tone mapping curve based on the frame metadata, sets the image quality of each frame of the frames of the HDR content based on the obtained frame tone mapping curve, and displays the image 60 of each frame of the frames based on the set image quality, thereby displaying the image 60 of the frame with the image quality optimized according to the frames as compared to the case where the image 10 of each frame of the frames is displayed with a batch-set image quality in the corresponding section based on only the section tone mapping curve.

Figure 4:
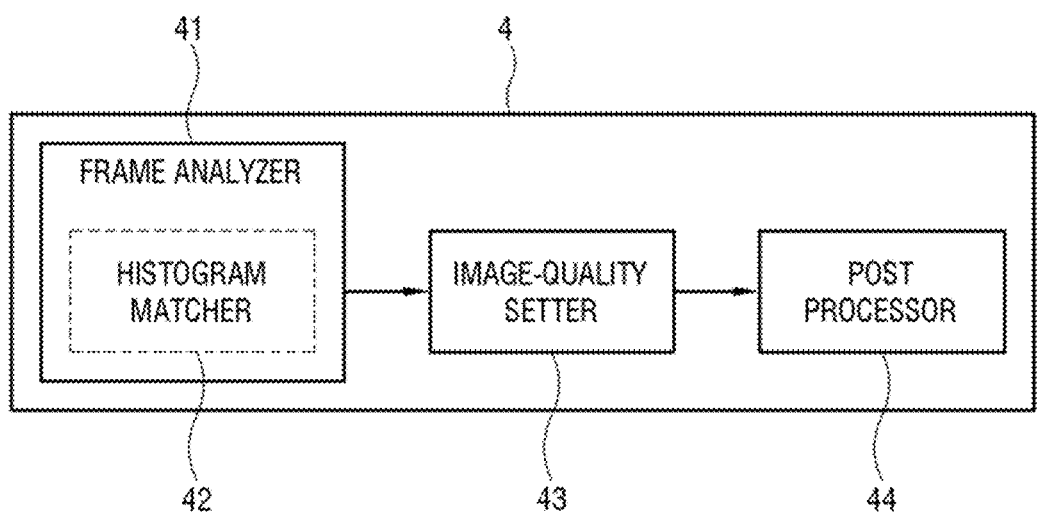
FIG. 4 is a block diagram showing an exemplary configuration of a processor in FIG. 1.

FIG. 4 is a block diagram showing an exemplary configuration of the processor in FIG. 2. Referring to FIG. 4, the processor 4 may include a frame analyzer 41, an image-quality setter 43, and a post processor 44, and the frame analyzer 41 may further include a histogram matcher 42.

The frame analyzer 41 may identify a frame, image quality of which will be set based on the frame image-quality setting information, among a plurality of frames in content. The frame analyzer 41 may identify the frame, the image quality of which will be set, based on difference between the section characteristic information showing image characteristics of a section in the content and the frame characteristic information showing the image characteristics of the frame of the section. However, the identification is not limited to this example. Alternatively, the frame analyzer 41 may identify at least one frame, which is identified based on predetermined periodicity or aperiodicity, among the plurality of frames included in the section, as the frame of which the image quality needs to be set based on the frame image-quality setting information.

The histogram matcher 42 may identify a frame of which image quality needs to be set based on comparison between a histogram of a frame and a histogram of a section to which the frame belongs. The comparison between the histograms may include comparison between the section and at least one among an average brightness value, a maximum brightness value, and a brightness value distribution of a plurality of pixels obtained from the histogram of the frame. In a case of the average brightness value, the histogram matcher 42 may for example identify a frame as the frame of which the image quality needs to be set, when difference between the average brightness value of the section and the average brightness value of the frame is greater than or equal to a predetermined threshold. Here, the predetermined threshold may be set with various values according to design methods.

The image-quality setter 43 may obtain the frame image-quality setting information based on the section image-quality setting information of the section to which the frame belongs and the frame characteristic information of the frame with regard to the frame identified by the frame analyzer 41, and set the image quality of the frame based on the obtained frame image-quality setting information.

For example, the image-quality setter 43 may adjust the section brightness-setting information of the section, to which the frame belongs, based on the frame characteristic information of the frame with regard to the frame identified by the frame analyzer 41, and obtain the frame brightness-setting information to display the image 60 of the frame within the brightness range of the corresponding frame.

Alternatively, the image-quality setter 43 may obtain the frame brightness-setting information to display the image 60 of the frame with the brightness range corresponding to the frame based on the frame characteristic information of the frame with regard to the frame identified by the frame analyzer 41. In other words, the image-quality setter 43 according to this embodiment may directly generate the frame brightness-setting information by taking the frame characteristic information into account, regardless of the section brightness-setting information of the section to which the frame belongs.

The post processor 44 may compensate for color distortion in the image 60 of the frame of which the image quality is set. For example, the post processor 44 may employ an infinite impulse response (IIR) filter to prevent a flicker phenomenon or the like that may occur while the image 60 of the frame, the image quality of which is set based on the frame image-quality setting information, is displayed.

Figure 5:
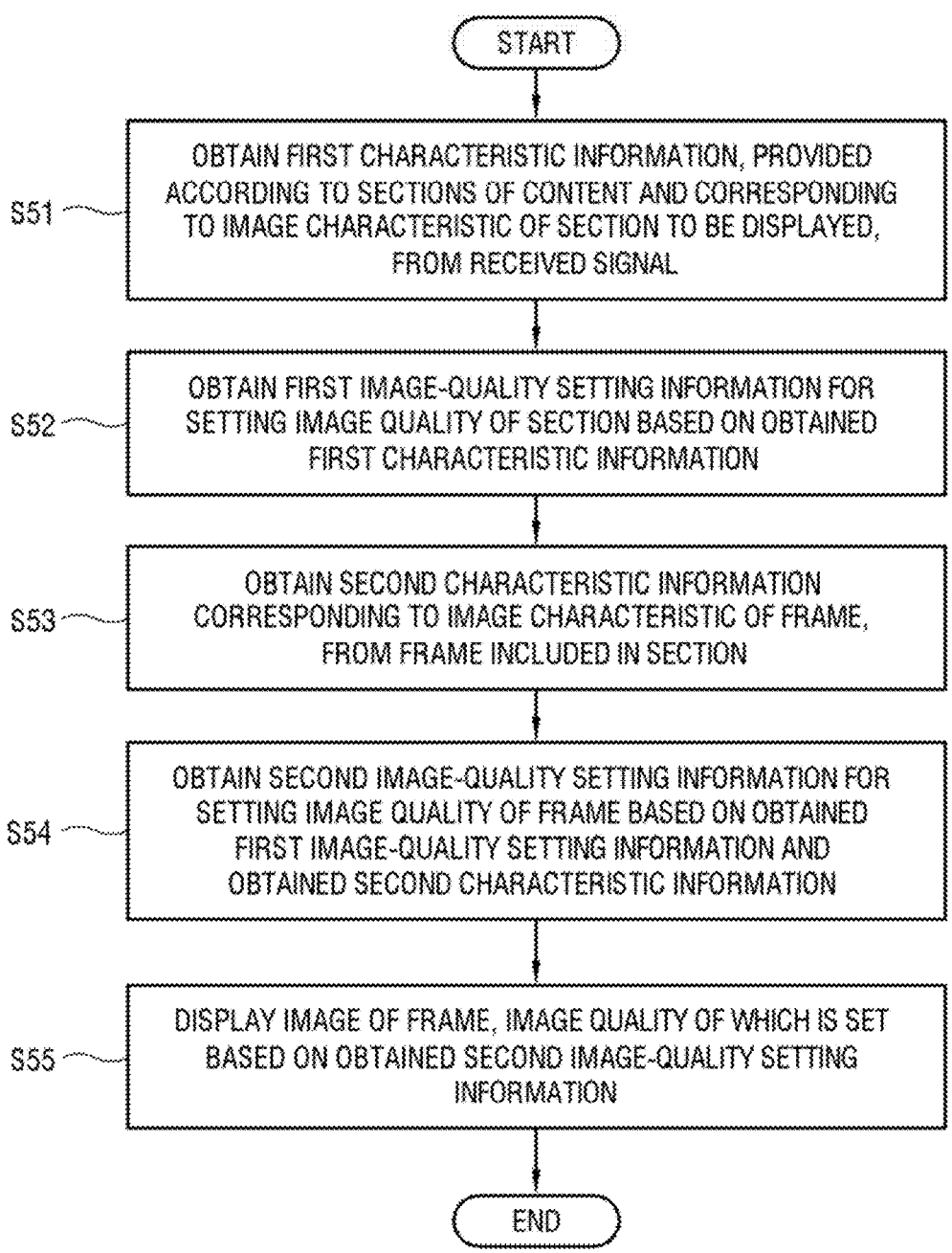
FIG. 5 is a flowchart showing an exemplary control method of the display apparatus in FIG. 1.

FIG. 5 shows a control method of the display apparatus in FIG. 1 by way of example. In this embodiment, the control method may be carried out as the processor 4 of the display apparatus 1 executes the control program described above. Hereafter, for convenience of description, the operations of the processor 4 carried out by executing the control program may be simply regarded as the operations of the processor 4.

Referring to FIG. 5, the processor 4 may obtain first characteristic information, which is provided according to the plurality of sections of the content and corresponds to an image characteristic of a section to be displayed among the plurality of sections, from the received signal (S51).

Further, the processor 4 may obtain the first image-quality setting information for setting the image quality of the section based on the obtained first characteristic information (S52).

Further, the processor 4 may obtain the second characteristic information, which corresponds to the image characteristic of the frame included in the section, from the frame (S53).

Further, the processor 4 may obtain the second image-quality setting information for setting the image quality of the frame based on the obtained first image-quality setting information and the obtained second characteristic information (S54).

Further, the processor 4 may display the image of the frame, the image quality of which is set based on the obtained second image-quality setting information (S55).

Thus, by the control method according to this embodiment, an image is displayed with optimum image quality even though image quality is suddenly varied within one section when the image-quality is set according to the section of the image, thereby increasing an immersion level of a user.

Meanwhile, the operations of the foregoing control method may be implemented by a computer program that includes instructions to make a computer carry out the operations, and such a computer program may be stored or recorded in a storage and the like recording medium.

Figure 6:
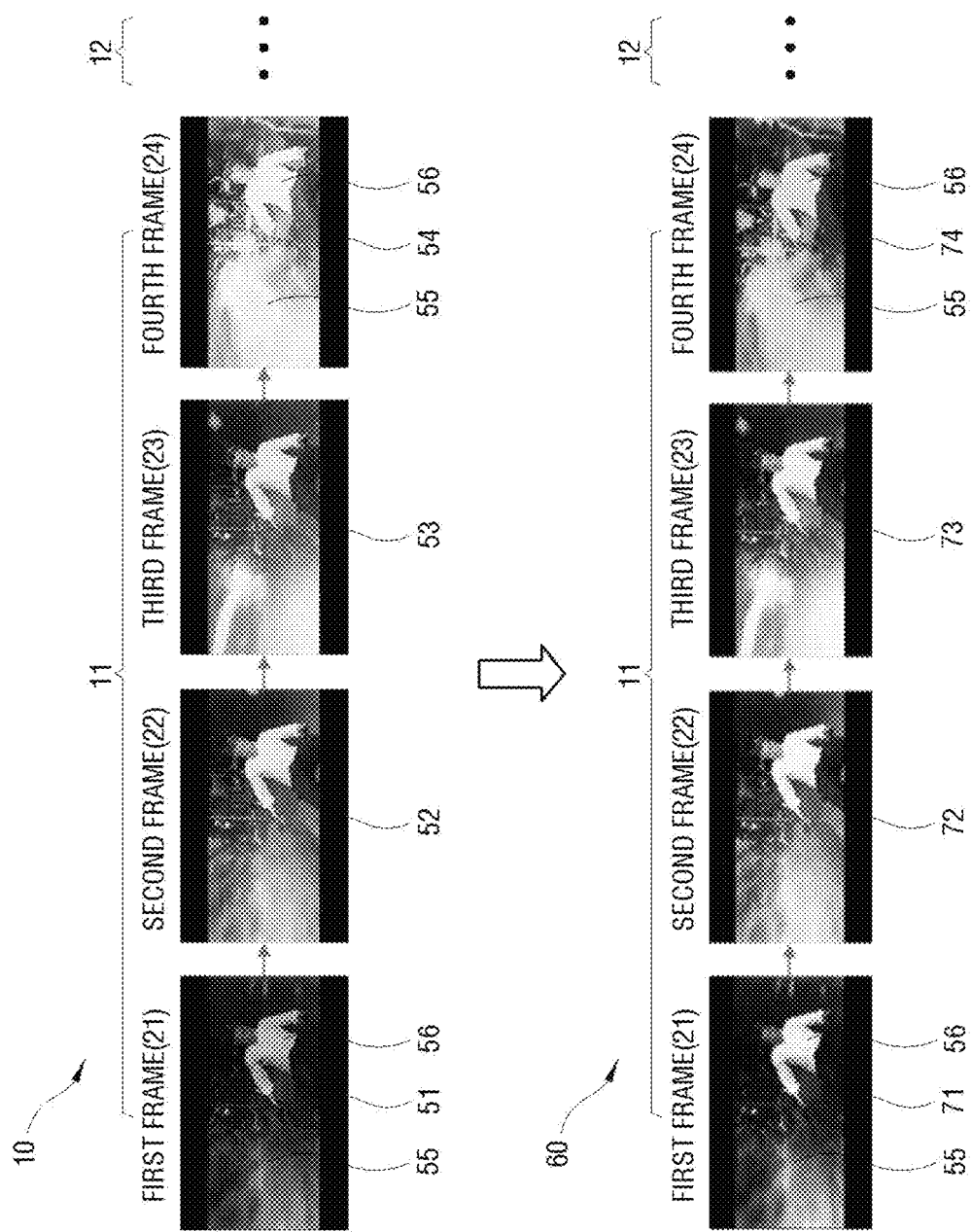
FIG. 6 illustrates an example of displaying images of a section in which image quality is set based on section image-quality setting information, and images of frames in which image quality is set based on frame image-quality setting information, in connection with operation S55 in FIG. 5.

FIG. 6 illustrates an example of displaying images of a section in which image quality is set based on section image-quality setting information, and images of frames in which image quality is set based on frame image-quality setting information, in connection with operation S55 in FIG. 5. As shown in FIG. 6, it will be assumed that content includes a plurality of sections 11 and 12 and the section 11 includes four frames, i.e., first to fourth frames 21, 22, 23 and 24. However, the number of sections and the number of frames in the content shown in FIG. 6 are just given for convenience of description, and may be varied depending on design methods.

The processor 4 may obtain the section image-quality setting information for setting the image quality of the section based on the section characteristic information of the section 11, and display the image 10 corresponding to the frames 21, 22, 23 and 24 included in the section 11 based on the obtained section image-quality setting information. In other words, the processor 4 may display images 51, 52, 53 and 54 with the image quality based on one piece of the section image-quality setting information with regard to the frames 21, 22, 23 and 24. For example, the processor 4 may display the images 51, 52, 53 and 54 within the brightness range set based on the section brightness-setting information of the section 11, to which the frames 21, 22, 23 and 24 belong, with respect to the frames 21, 22, 23 and 24.

In particular, the processor 4 according to this embodiment may obtain the frame image-quality setting information corresponding to each of the frames 21, 22, 23 and 24, based on the section image-quality setting information of the section 11 to which the frames 21, 22, 23 and 24 belong and the frame characteristic information of each of the frames 21, 22, 23 and 24. Further, the processor 4 may set the image quality of each of the frames 21, 22, 23 and 24 based on the obtained frame image-quality setting information, and display images 71, 72, 73 and 74 of the corresponding frames with the set image quality. For example, the processor 4 may obtain the frame brightness-setting information based on the section brightness-setting information of the section 11 to which the frames 21, 22, 23 and 24 belong and the frame characteristic information corresponding to each of the frames 21, 22, 23 and 24, and display the images 71, 72, 73 and 74 of the frames 21, 22, 23 and 24 within the brightness range set based on the obtained frame brightness-setting information.

Below, comparison between the image 10 of the frames 21, 22, 23 and 24 displayed in the brightness range set based on only the section image-quality setting information and the image 60 of the frames 21, 22, 23 and 24 displayed in the brightness range set based on the frame brightness-setting information will be described with reference to FIG. 6, on the assumption that brightness suddenly increases between the first frame 21 and the fourth frame 24 in the section 11.

As shown in FIG. 6, scenes in which a person 56 is in the dark and a light 55 slowly moves toward the person 56 are respectively displayed on the frames 21, 22, 23 and 24. When the first frame 21 and the fourth frame 24 are displayed in a set brightness range based on only the section brightness-setting information, the image 51 of the first frame 21 in which the light 55 is distant from the person 56 is displayed darkly, but the image 54 of the fourth frame 24 in which the light 55 is near to the person 56 is displayed brightly.

According to this embodiment, the processor 4 may set the brightness range of the first frame 21 according to first frame brightness-setting information obtained based on the section brightness-setting information of the section 11 and first frame characteristic information of the first frame 21. Because the processor 4 displays the image 71 of the first frame 21 with the set brightness range, the image 71 of the first frame 21 in which the light 55 is distant from the person 56 is displayed more brightly than the image 51 of the first frame 21 based on only the section brightness-setting information.

Further, the processor 4 may set the brightness range of the fourth frame 24 according to fourth frame brightness-setting information obtained based on the section brightness-setting information of the section 11 and fourth frame characteristic information of the fourth frame 24. Because the processor 4 displays the image 74 of the fourth frame 24 with the set brightness range, the image 74 of the fourth frame 24 in which the light 55 is near to the person 56 is displayed more darkly than the image 54 of the fourth frame 24 based on only the section brightness-setting information. Likewise, regarding the second frame 22 and the third frame 23, the processor 4 may display each of the image 72 of the second frame 22 and the image 73 of the third frame 23 with the set brightness range based on each frame brightness-setting information.

Thus, the processor 4 according to this embodiment obtains the frame brightness-setting information based on the frame characteristic information of the frames 21, 22, 23 and 24 and the section brightness-setting information of the section 11 with regard to the frames 21, 22, 23 and 24 of the section 11, displays the images 71, 72, 73 and 74 with the set brightness range based on the obtained frame brightness-setting information, thereby displaying the images 71, 72, 73 and 74 of the frames 21, 22, 23 and 24 with the brightness ranges optimized according to the frames 21, 22, 23 and 24 as compared to the case where the images 51, 52, 53 and 54 of the frames 21, 22, 23 and 24 are displayed with the set brightness range based on only the section brightness-setting information of the section 11.

Alternatively, the processor 4 may set a brightness range based on frame setting information with regard to only some frames, without setting the brightness range based on the frame setting information of all the frames 21, 22, 23 and 24 in the section 11. For example, the processor 4 may set the brightness range based on the frame setting information of only at least one frame selected among the frames 21, 22, 23 and 24 based on predetermined periodicity or aperiodicity. Thus, resources may be more efficiently used than those of when the image quality is set based on the frame image-quality setting information of all the frames.

Figure 7:
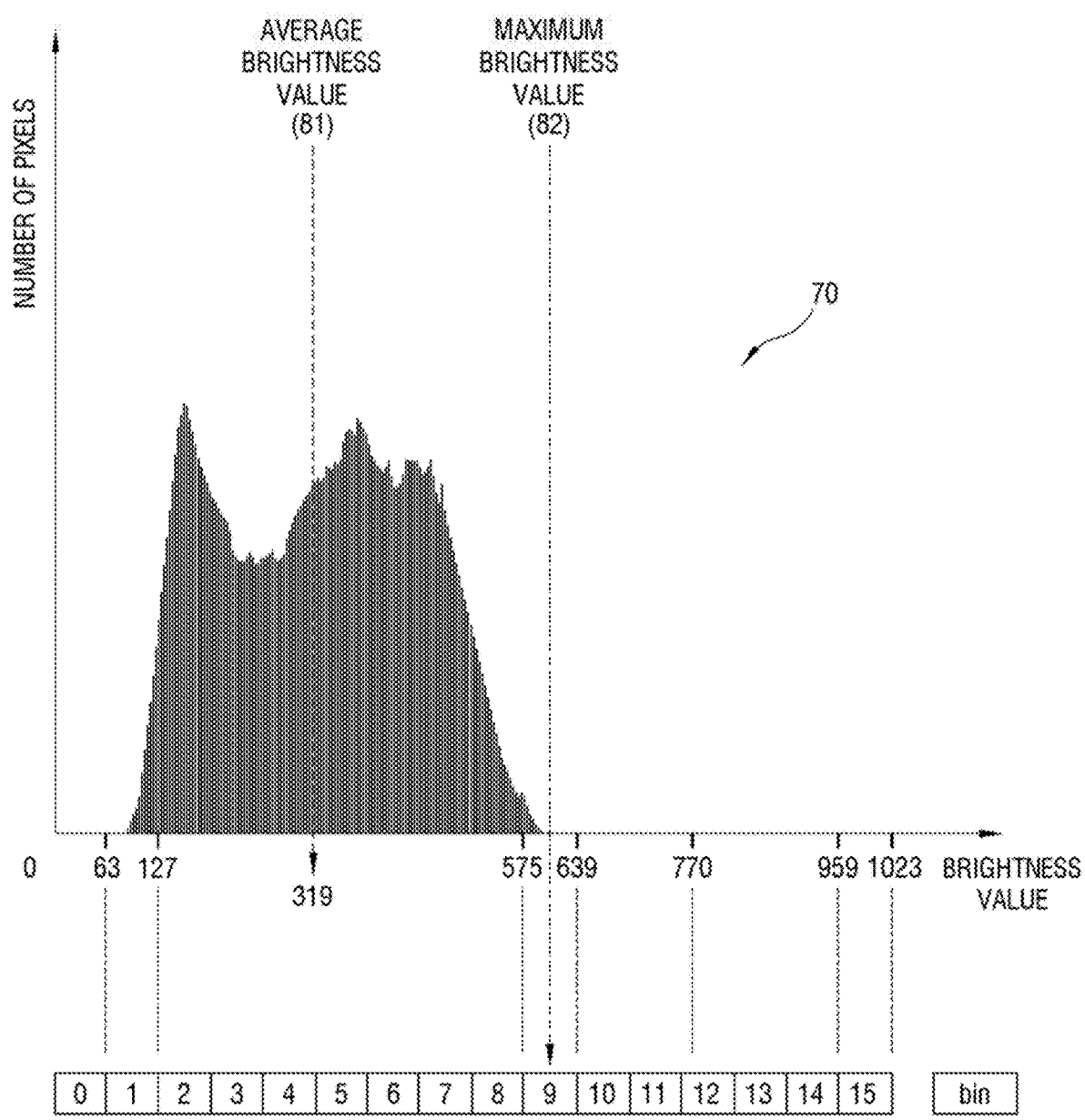
FIG. 7 illustrates a histogram for obtaining characteristic values of characteristic information, in connection with operation S53 in FIG. 5.
Figure 8:
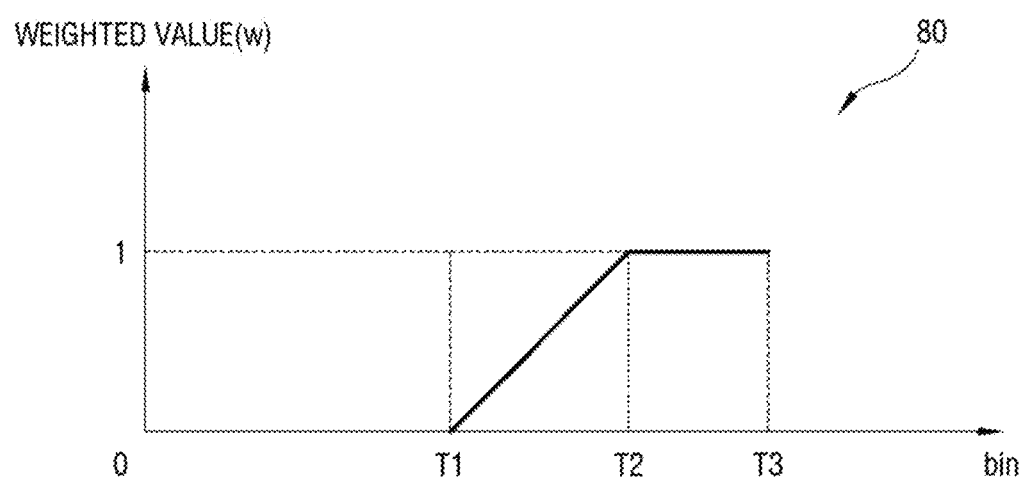
FIG. 8 is a graph showing weighted values in brightness value distribution obtained based on the histogram.

FIG. 7 illustrates a histogram for obtaining characteristic values of characteristic information, in connection with operation S53 in FIG. 5, and FIG. 8 is a graph showing weighted values in brightness value distribution obtained based on the histogram.

The processor 4 may obtain a histogram of the frames 21, 22, 23 and 24 which belong to the section 11 of the content. The histogram may be included in the section characteristic information of the section 11 or the frame characteristic information of the frames 21, 22, 23 and 24.

The histogram refers to a graph showing how many pixels have a corresponding brightness value with respect to the brightness values of the frames 21, 22, 23 and 24. Below, a process of obtaining a characteristic value of frame characteristic information from the histogram will be described in detail on the assumption that the processor 4 obtains the histogram as shown in FIG. 7 with respect to the first frame 21 of FIG. 6. However, the histogram shown in FIG. 7 is merely given for convenience of description, and therefore, even when another histogram is obtained with regard to another frame, the characteristic value of the frame characteristic information may also be obtained from the histogram about the corresponding frame by the process set forth herein.

The processor 4 may obtain a characteristic value of the first frame 21, for example, at least one among an average brightness value 81 of a plurality of pixels of the first frame 21, a maximum brightness value 82 of the first frame 21, and a distribution of brightness values of the first frame 21, from the histogram.

The average brightness value 81 may be obtained by dividing the sum of brightness values of the whole pixels by a total number of pixels. Referring to FIG. 7, the plurality of pixels of the first frame 21 has the average brightness value 81 of '319' in the whole brightness values from '0' to '1023'.

Further, the maximum brightness value 82 refers to a bin in which the pixel having the maximum brightness value is distributed. Referring to FIG. 7, when the whole brightness values from '0' to '1023' are divided into sixteen bins, the maximum brightness value 82 may be identified as the ninth bin.

Meanwhile, the distribution of the brightness values may be identified by the following expression.

$$\text{Distribution of Brightness value} = \sum_{i=T1}^{T3} w(i) * \text{Histogram}(i)$$

In this expression, T1 and T3 may indicate the bins of the histogram, which the brightness values of the plurality of pixels are distributed. Further, w(i) may indicate a weighted value of Histogram(i), and Histogram(i) may indicate the number of pixels in a histogram corresponding to a corresponding bin.

FIG. 8 is a graph 80 showing a weighted value w about the distribution of the brightness values obtained based on the histogram. Referring to FIG. 8, the weighted value w about the distribution of the brightness values may be given in a function form of the bin of the histogram. In other words, the weighted value w may be set to slowly increase from a first bin T1 to a second bin T2, but be maintained constant from the second bin T2 to the third bin T3. Here, the first bin T1 to the third bin T3 may be set with various values based on the histograms of the frames according to design methods.

In this manner, the processor 4 may obtain the average brightness value 81 of the plurality of pixels of the frames 21, 22, 23 and 24, the maximum brightness value 82 of the frames 21, 22, 23 and 24, the distribution of the brightness values of the frames 21, 22, 23 and 24, and the like characteristic values from the histograms of the frames 21, 22, 23 and 24 which belong to one section 11.

Figure 9:
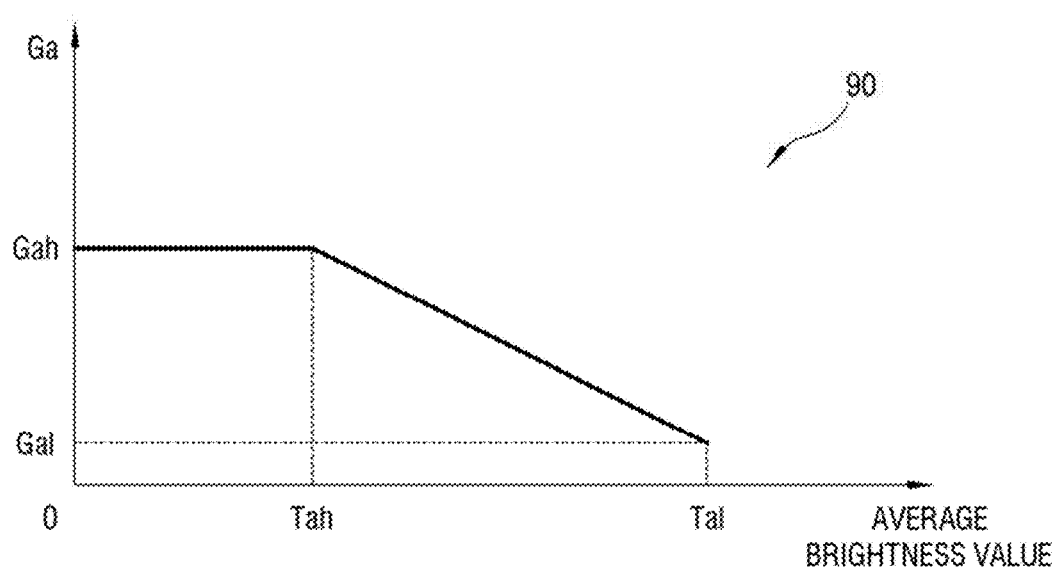
FIG. 9 is a graph showing gains assigned to the characteristic values of the characteristic information, in connection with operation S53 in FIG. 5.

FIG. 9 is a graph 90 showing gains assigned to the characteristic values of the characteristic information, in connection with operation S53 in FIG. 5. As shown in FIG. 8, the processor 4 may obtain the characteristic values about the plurality of pixels of the frames 21, 22, 23 and 24 in one section 11. The characteristic values may for example include the average brightness value 81, the maximum brightness value 82, the distribution of the brightness values, etc. of the first frame 21.

Below, a process of setting a gain to the average brightness value 81 of the first frame 21 will be described in detail with reference to the gain graph of FIG. 9. However, the gain graph shown in FIG. 9 is given by way of example for convenience of description, and thus various graphs may be provided according to design methods.

Referring to the gain graph of FIG. 9, a gain about the average brightness value 81 of the first frame 21 may be set as the highest gain Gah between '0' and a first average brightness value Tah, and may be set to gradually decrease from the highest gain Gah to the lowest gain Gal between the first average brightness value Tah and a second average brightness value Tal. Likewise, a gain about the maximum brightness value 82 of the first frame 21 may also be set as the highest gain between '0' and a first maximum brightness value, and may be set to gradually decrease from the highest gain to the lowest gain between the first maximum brightness value and a second maximum brightness value. In addition, a gain about the brightness value distribution may also be constantly set as the highest gain between '0' and a first maximum brightness value, and may be set to gradually decrease from the highest gain to the lowest gain between the first maximum brightness value and a second maximum brightness value.

The processor 4 may for example identify the first frame characteristic information of the first frame 21 based on a total gain obtained by adding up the gain about the average brightness value 81 of the first frame 21, the gain about the maximum brightness value 82 of the first frame 21, and the gain about the brightness value distribution of the first frame 21. In this case, the processor 4 may obtain the first frame image-quality setting information by applying the identified first frame characteristic information to the section image-quality setting information of the section 11, and set the image quality of the first frame 21 based on the obtained first frame image-quality setting information. Similarly, the processor 4 may identify the total gain about the fourth frame 24 as the fourth frame characteristic information of the fourth frame 24, obtain the fourth frame image-quality setting information by applying the identified fourth frame characteristic information to the section image-quality setting information, and set the image quality of the fourth frame 24 based on the obtained fourth frame image-quality setting information.

Below, it will be described in more detail with reference to FIGS. 6, 7 and 9 that the image qualities about the first frame 21 and the fourth frame 24 are set when brightness is suddenly increased between the first frame 21 and the fourth frame 24 in one section 11. When the first frame 21 and the fourth frame 24 are displayed in the brightness range set based on the section brightness-setting information of the section 11, the image 51 of the first frame 21 may be too dark and the image 54 of the fourth frame 24 may be too bright.

When the total gain obtained by adding up the gain about the average brightness value 81 of the first frame 21, the gain about the maximum brightness value 82 of the first frame 21, and the gain about the brightness value distribution of the first frame 21, which is greater than '1', is applied to the section brightness-setting information, the image 71 of the first frame 21 based on the first frame brightness-setting information may be displayed more brightly than the image 51 of the first frame 21 based on the section brightness-setting information.

Regarding the fourth frame 24, when the total gain obtained by adding up the gain about the average brightness value 81 of the fourth frame 24, the gain about the maximum brightness value 82 of the fourth frame 24, and the gain about the brightness value distribution of the fourth frame 24, which is greater than '1', is applied to the section brightness-setting information, the image 74 of the fourth frame 24 based on the fourth frame brightness-setting information may be displayed more darkly than the image 54 of the fourth frame 24 based on the section brightness-setting information.

Thus, the processor 4 according to this embodiment sets the gain to the characteristic values of the frames 21, 22, 23 and 24, and displays the image 60 of the frames 21, 22, 23 and 24 in the brightness range set based on the set gain, thereby displaying the image 60 with the image quality optimized according to the frames 21, 22, 23 and 24.

Figure 10:
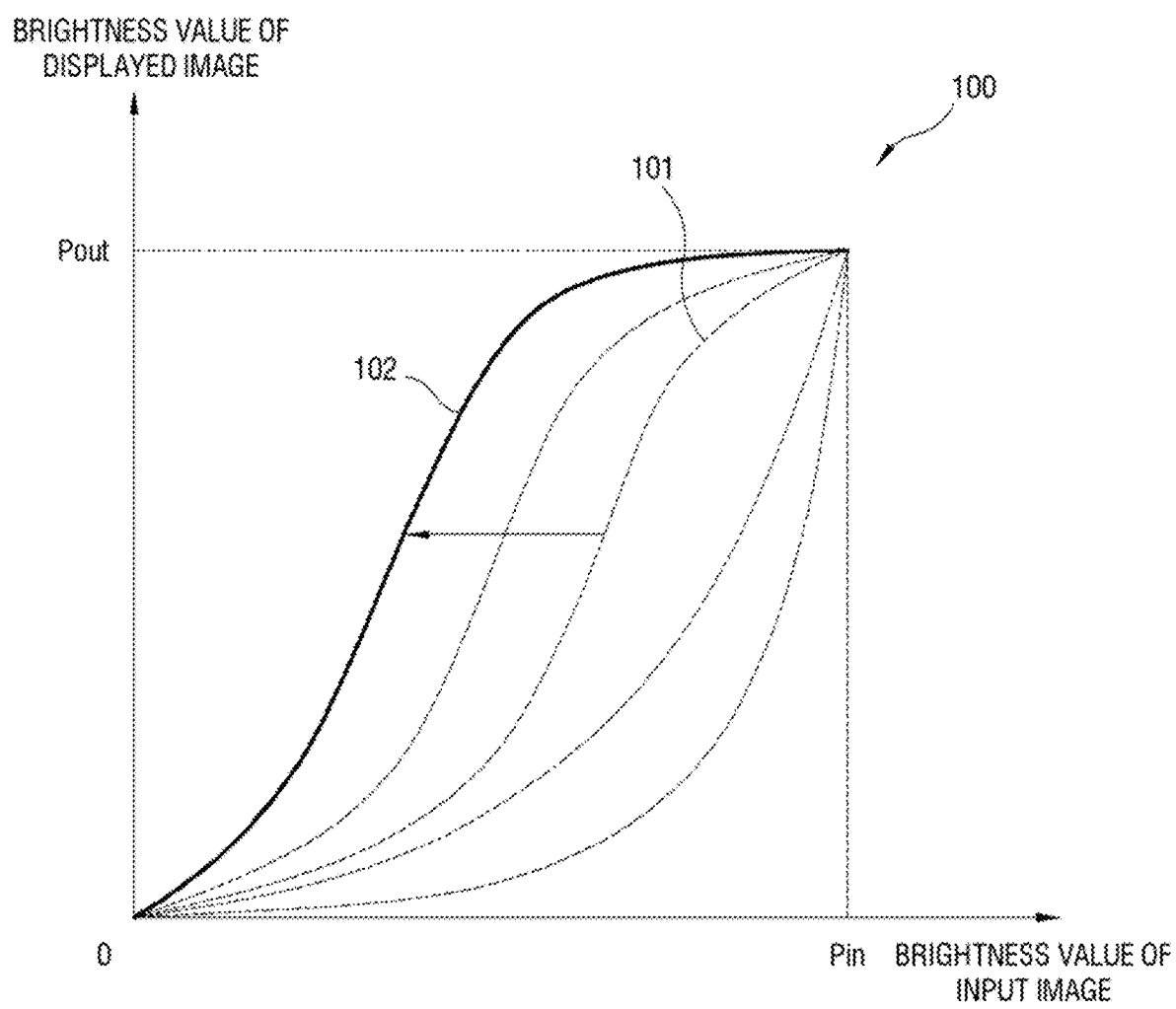
FIG. 10 is a graph showing an example of obtaining a frame tone mapping curve by applying frame characteristic information to a section tone mapping curve, in connection with operation S54 in FIG. 5.

FIG. 10 is a graph 100 showing an example of obtaining a frame tone mapping curve by applying frame characteristic information to a section tone mapping curve, in connection with operation S54 in FIG. 5. According to this embodiment, the processor 4 may obtain the section image-quality setting information for setting the image quality of the section, and the frame image-quality setting information for setting the image quality of the frame based on the frame characteristic information about the image characteristics of the frame which belongs to the section. Below, it will be described in detail with reference to FIGS. 6 and 10 that the frame tone mapping curve is obtained based on the section tone mapping curve and the frame characteristic information when the section image-quality setting information includes the section tone mapping curve for setting the tone of the image in the section and the frame image-quality setting information includes the frame tone mapping curve for setting the tone of the image of the frame.

As described above with reference to FIG. 6, the processor 4 may obtain a section tone mapping curve 101 of the section 11, to which the first frame 21 belongs, based on the section characteristic information like that of FIG. 10. When the processor 4 displays the image 51 of the first frame 21 in the set brightness range based on the section tone mapping curve 101, the image 51 may be relatively darkly displayed.

The processor 4 may adjust the section tone mapping curve 101 to a first frame tone mapping curve 102 corresponding to the first frame 21 based on the first frame characteristic information of the first frame 21. For example, as described above with reference to FIG. 9, the first frame characteristic information may correspond to the total gain about the characteristic value of the first frame 21. In other words, the processor 4 may obtain the first frame tone mapping curve 102 by adjusting the section tone mapping curve 101 to correspond to the total gain. Regarding the brightness value of one input image, a brightness value of a displayed image set based on the first frame tone mapping curve 102 may be higher than a brightness value of a displayed image set based on the section tone mapping curve 101. Therefore, the image 71 with the brightness set based on the first frame tone mapping curve 102 may be displayed more brightly than the image 51 with the brightness set based on the section tone mapping curve 101.

Figure 11:
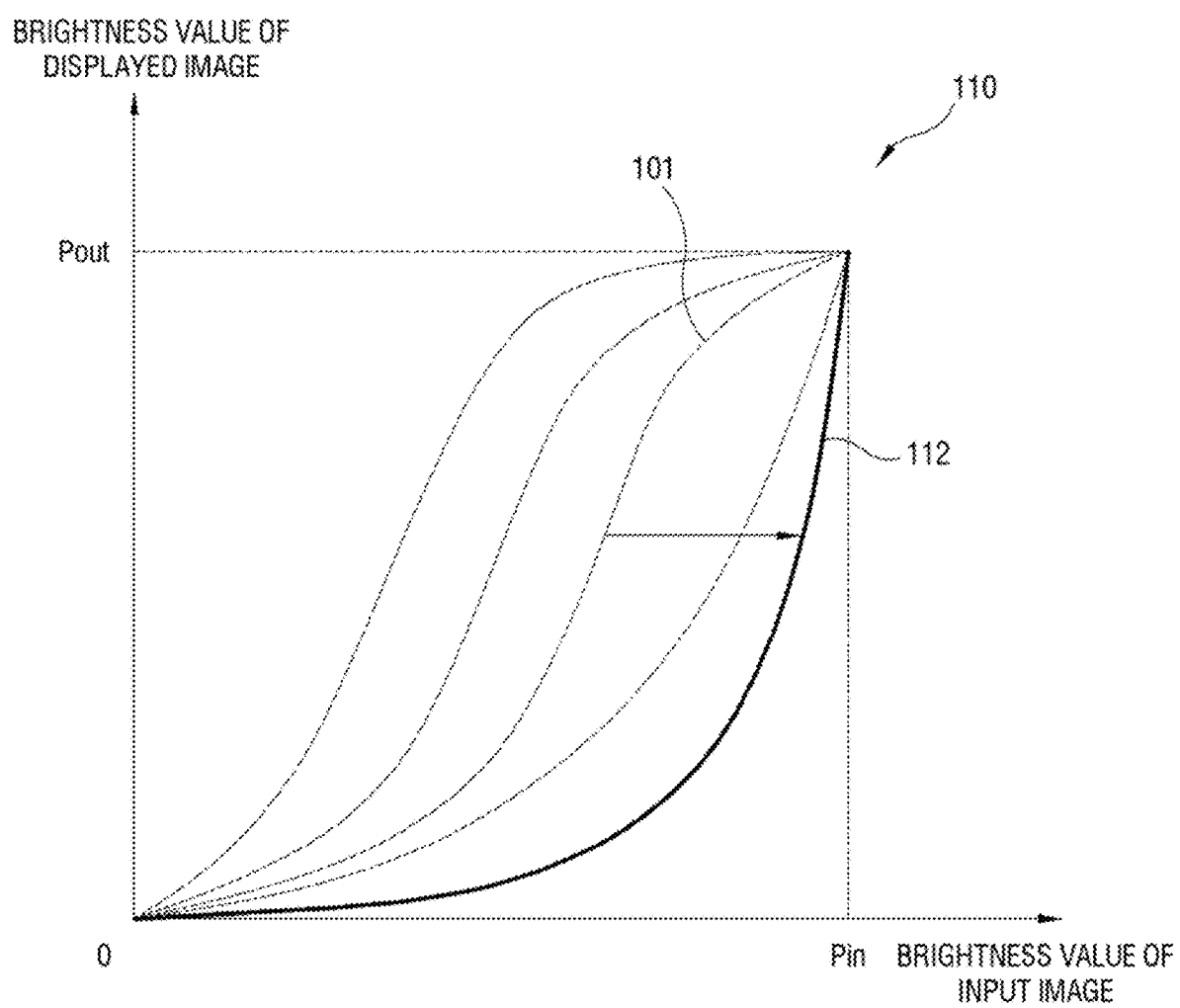
FIG. 11 is a graph showing another example of obtaining a frame tone mapping curve by applying frame characteristic information to a section tone mapping curve, in connection with operation S54 in FIG. 5.

FIG. 11 is a graph 110 showing another example of obtaining a frame tone mapping curve by applying frame characteristic information to a section tone mapping curve, in connection with operation S54 in FIG. 5. It is described with reference to FIG. 10 that the first frame tone mapping curve 102 of the first frame 21 of FIG. 6 is obtained, whereas it will be described below in detail that the fourth frame tone mapping curve of the fourth frame 24 of FIG. 6 is obtained.

As described above with reference to FIG. 10, the processor 4 may obtain the section tone mapping curve 101 of the section 11, to which the fourth frame 24 belongs. When the processor 4 displays the image 54 of the fourth frame 24 in the brightness range set based on the section tone mapping curve 101, the image 54 may be too bright.

Therefore, the processor 4 may adjust the section tone mapping curve 101 to a fourth frame tone mapping curve 112 corresponding to the fourth frame 24 based on the fourth frame characteristic information of the fourth frame 24. For example, the fourth frame characteristic information may include the total gain about the characteristic value of the fourth frame 24 as described above with reference to FIG. 9. In this case, the processor 4 may obtain the fourth frame tone mapping curve 112 by adjusting the section tone mapping curve 101 to correspond to the total gain. Regarding the brightness value of one input image, a brightness value of a displayed image set based on the fourth frame tone mapping curve 112 may be lower than a brightness value of a displayed image set based on the section tone mapping curve 101. Therefore, the image 74 with the brightness set based on the fourth frame tone mapping curve 112 may be displayed more darkly than the image 54 with the brightness set based on the section tone mapping curve 101.

Figure 12:
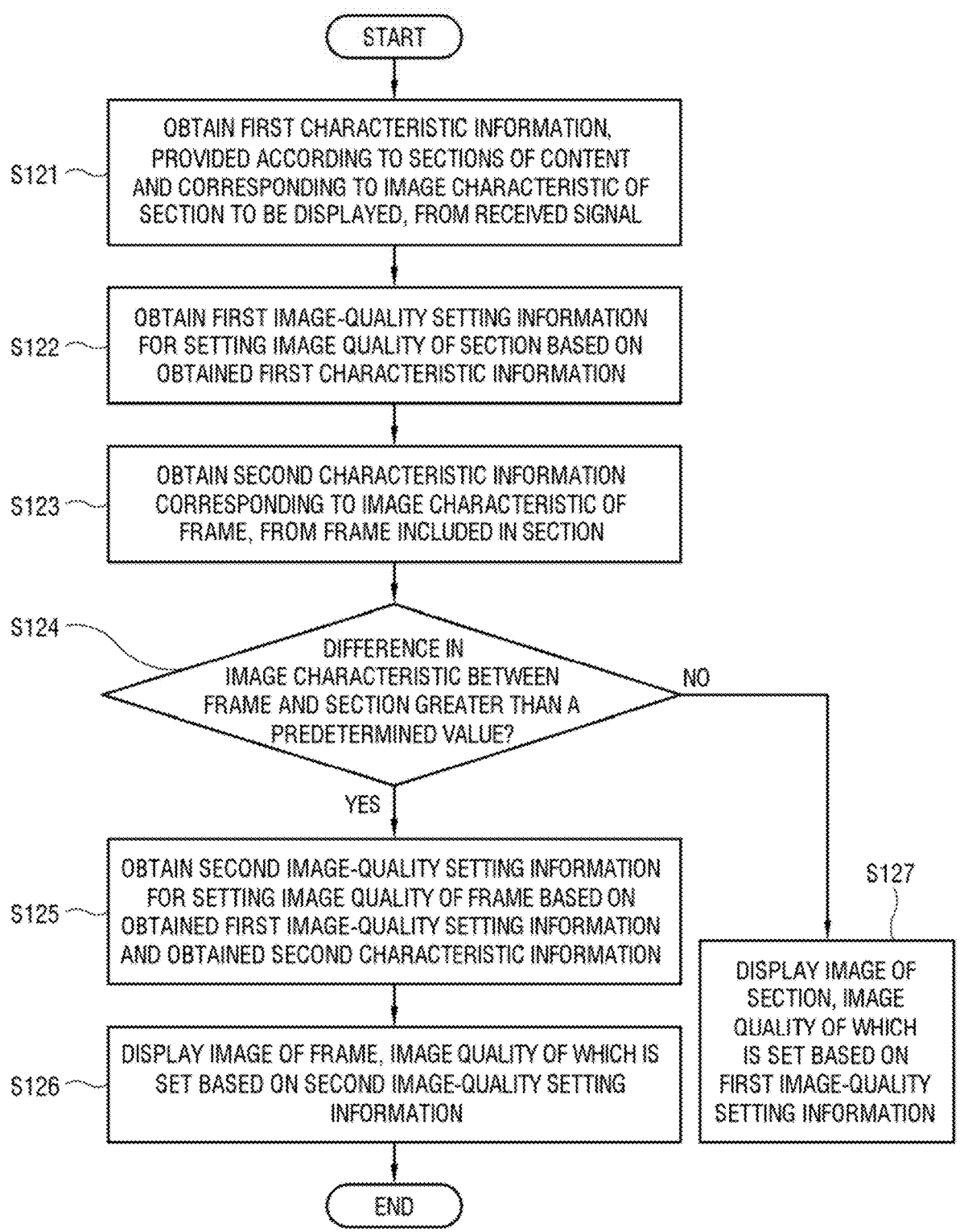
FIG. 12 is a flowchart showing another exemplary control method of the display apparatus in FIG. 1.

FIG. 12 is a flowchart showing another exemplary control method of the display apparatus in FIG. 1. Operations S121 to S123 in FIG. 12 are equal to the operations S51 to S53 in FIG. 5, and therefore descriptions will be made avoiding repetitive descriptions and focusing on only difference for convenience of description.

Referring to FIG. 12, the processor 4 according to this embodiment may identify whether difference between the image characteristic of the frame and the image characteristic of the section is greater than or equal to a predetermined value (S124).

When it is identified in the operation S124 that the difference is greater than or equal to the predetermined value, the processor 4 obtains the second image-quality setting information for setting the image quality of the frame based on the obtained first image-quality setting information and the obtained second characteristic information (S125), and displays the image of the frame, the image quality of which is set based on the second image-quality setting information (S126).

On the other hand, when it is identified in the operation S124 that the difference is lower than the predetermined value, the processor 4 displays the image of the section, the image quality of which is set based on the first image-quality setting information (S127).

Thus, by the control method according to this embodiment, the image quality is set for the identified frame based on the frame image-quality setting information, and thus resources are more efficiently used than those of when the image qualities are set for all the frames based on the frame image-quality setting information. The operations of the foregoing control method of this embodiment may be implemented by a computer program that includes instructions to make a computer carry out the operations, and such a computer program may be stored or recorded in a storage and the like recording medium. In this disclosure, the storage may be provided as a non-transitory storage medium. Here, the term "non-transitory" means that the storage medium does not include a signal and is tangible but does not indicate whether data is stored in the storage medium semi-permanently or temporarily.

According to the disclosure, there are provided a display apparatus and a control method thereof, in which an image is displayed with optimum image quality even though brightness is suddenly varied within one scene, by applying DTM based on an image analysis performed in units of frames when image quality is set according to the scenes of the image, thereby increasing an immersion level of a user.

Although a few embodiments of the disclosure have been described in detail, the disclosure is not limited to these embodiments but variously embodied within the appended claims.

What is claimed is:

1. A display apparatus comprising:
a signal receiver;
a display; and
a processor configured to:
identify an image characteristic of a section among a plurality of sections included in a content from a signal received through the signal receiver,
obtain first image-quality setting information for setting image quality of the section based on the identified image characteristic of the section,
identify an image characteristic of a frame among a plurality of frames included in the section,
obtain second image-quality setting information for setting image quality of the frame by adjusting the obtained first image-quality setting information based on the identified image characteristic of the frame, and
control the display to display an image of the frame, the image quality of the frame being set based on the obtained second image-quality setting information.

2. The display apparatus according to claim 1, wherein the first image-quality setting information comprises a first mapping curve for setting a tone of an image to be displayed based on an input image.

3. The display apparatus according to claim 1, wherein the image characteristic of the frame comprises information obtained from a histogram about a plurality of pixel values of the frame.

4. The display apparatus according to claim 1, wherein the image characteristic of the frame comprises at least one of an average brightness value, a maximum brightness value, or a brightness value distribution of a plurality of pixels of the frame.

5. The display apparatus according to claim 1, wherein the image characteristic of the frame comprises a plurality of characteristic values obtained from a plurality of pixels of the frame, and the processor is configured to obtain the second image-quality setting information by applying a weighted value to the plurality of characteristic values.

6. The display apparatus according to claim 1, wherein the processor is configured to set the image quality of the frame based on the second image-quality setting information, based on difference between the image characteristic of the frame and the image characteristic of the section being greater than or equal to a predetermined value.

7. The display apparatus according to claim 1, wherein the processor is configured to set the image quality of the frame based on the first image-quality setting information, based on difference between the image characteristic of the frame and the image characteristic of the section being lower than a predetermined value.

8. The display apparatus according to claim 1, wherein the processor is configured to:
    select the frame from among the plurality of frames in the section based on predetermined periodicity, and
    set the image quality of the selected frame based on the second image-quality setting information of the selected frame.

9. A method of controlling a display apparatus, the method comprising:
    identifying an image characteristic of a section among a plurality of sections included in a content from a received signal;
    obtaining first image-quality setting information for setting image quality of the section based on the identified image characteristic of the section obtained;
    identifying an image characteristic of a frame among a plurality of frames included in the section;
    obtaining second image-quality setting information for setting image quality of the frame by adjusting the obtained first image-quality setting information based on the identified image characteristic of the frame; and
    displaying an image of the frame; the image quality of the frame being set based on the obtained second image-quality setting information.

10. The method according to claim 9, wherein the first image-quality setting information comprises a first mapping curve for setting a tone of an image to be displayed based on an input image.

11. The method according to claim 9, wherein the image characteristic of the frame comprises information obtained from a histogram about a plurality of pixel values of the frame.

12. The method according to claim 9, wherein the image characteristic of the frame comprises at least one of an average brightness value, a maximum brightness value, or a brightness value distribution of a plurality of pixels of the frame.

13. The method according to claim 9, wherein
    the image characteristic of the frame comprises a plurality of characteristic values obtained from a plurality of pixels of the frame, and
    the obtaining of the second image-quality setting information comprises obtaining the second image-quality setting information by applying a weighted value to the plurality of characteristic values.

14. The method according to claim 9, wherein the obtaining of the second image-quality setting information comprises setting the image quality of the frame based on the second image-quality setting information, based on difference between the image characteristic of the frame and the image characteristic of the section being greater than or equal to a predetermined value.

15. The method according to claim 9, wherein the obtaining of the second image-quality setting information comprises setting the image quality of the frame based on the first image-quality setting information, based on difference between the image characteristic of the frame and the image characteristic of the section being lower than a predetermined value.

16. The method according to claim 9, wherein the displaying of the image of the frame comprises:
    selecting the frame from among the plurality of frames in the section based on predetermined periodicity, and
    setting the image quality of the selected frame based on the second image-quality setting information of the selected frame.

17. A non-transitory computer-readable recording medium having recorded thereon a computer program for carrying out a method of controlling a display apparatus, the method comprising:
    identifying an image characteristic of a section among a plurality of sections included in a content from a received signal;
    obtaining first image-quality setting information for setting image quality of the section based on the identified image characteristic of the section;
    identifying an image characteristic of a frame among a plurality of frames included in the section;
    obtaining second image-quality setting information for setting image quality of the frame by adjusting the obtained first image-quality setting information based on the identified image characteristic of the frame; and
    displaying an image of the frame, the image quality of the frame being set based on the obtained second image-quality setting information.

18. The non-transitory computer-readable recording medium of claim 17, wherein the obtaining of the second image-quality setting information comprises setting the image quality of the frame based on the second image-quality setting information, based on difference between the image characteristic of the frame and the image characteristic of the section being greater than or equal to a predetermined value.

* * * * *